UNITED STATES PATENT OFFICE.

GEORGE L. EDGERTON, OF GOLDSBORO, NORTH CAROLINA.

MEDICATED SALT BRICK.

1,204,551.  Specification of Letters Patent.  Patented Nov. 14, 1916.

No Drawing.  Application filed March 19, 1915.  Serial No. 15,551.

*To all whom it may concern:*

Be it known that I, GEORGE L. EDGERTON, a citizen of the United States, residing at Goldsboro, in the county of Guilford and State of North Carolina, have invented a new and useful Medicated Salt Brick, of which the following is a specification.

This invention has reference to medicated salt bricks for the treatment of sickly animals, such as horses, cattle, hogs and sheep.

It has long been recognized that animals require a certain amount of salt, and sickly animals need medical treatment from time to time. Animals eagerly take salt, and the salt is very readily given to the animals in bulk, and especially in lump form, so that they may lick the salt and thus obtain the required amount in small quantities. The eagerness with which animals will lick salt makes the salt a convenient vehicle for the administration of various medicines.

Sulfur, saltpeter, nux vomica, copperas and aloes are commonly used in stock foods, and are generally recognized as excellent medicines for horses and other animals. It is also generally known that the best way to administer such medicinal ingredients is in conjunction with salt.

It has been proposed to mix medicinal ingredients with salt and form the salt into bricks with a hardening agent which has heretofore been either cement or clay, and such hardening agent must form a relatively large proportion of the brick in order that the brick be made hard and be prevented from crumbling until used as needed by the animal. Such hardening material, whether cement or clay, is found to be injurious to the animals and despite the presence of the hardening material the brick will often crumble in damp weather.

When salt and medicinal ingredients are mixed with clay in the formation of a medicated salt brick, the brick must be kiln dried in order to harden the clay and even then the hygroscopic nature of salt causes a crumbling of the brick in damp weather. The same difficulty has been found when cement is used as the binder.

It has been found necessary with salt bricks on the market to pack them in air tight containers, so as to keep them from crumbling under the action of age and moist air, and when put in the trough the commercial bricks crumble and get soft before the animal can lick them up. This permits the animal to eat the brick too quickly and the animal therefore is often made sick by the excessive amount of material so obtained. Moreover, the cement or clay heretofore used as a binder for the salt and other ingredients not only represents a relatively large proportion of the brick, but has been found to be detrimental to the animal.

In accordance with the present invention the binder employed is a mixture of plaster of Paris and slaked lime, which together may represent but a relatively small part of the total volume of the brick, and such binding ingredients have been found to stand up under the action of moist air or age without any tendency to crumble, wherefore the animals slowly lick up the brick until it is all gone without any chance of obtaining undue quantities at any time. The salt dissolves but slowly under the act of licking, so that a brick will last for a relatively long time and the animal not only obtains the needed salt, but also is subjected to the remedial action of the medicinal agents administered in curative quantities and not in harmful quantities.

The brick of the present invention is composed of salt in quantity representing about eighty-five per cent. of the finished brick; sulfur, which is a remedy for the blood, five per cent.; saltpeter, which is a remedy for the kidneys, two per cent.; copperas, which is a tonic, two per cent.; nux vomica, which is a remedy for worms, one per cent.; plaster of Paris two and one-half per cent., and slaked lime two and one-half per cent., the latter having medicinal properties.

In preparing the brick the ingredients are mixed with enough water to hydrate the plaster of Paris. The bricks can be made of any size and are readily molded into shape without the necessity of any special machinery. The plaster of Paris appears to have a special hardening effect in conjunction with salt, since salt bricks made as described have been kept a year or more without any attempt to protect them from weather conditions and without any signs of crumbling. Where clay is employed as a binder it is necessary to kiln dry the brick, and this has a detrimental effect upon sulfur and others of the medicinal agents, and also upon the salt. The brick of the present invention also contains a much larger proportion of salt than is possible where clay or cement is employed as the binding agent.

The brick of the present invention not only stands up under weather conditions, but is so slowly soluble under the action of the saliva of the animal on licking the brick that the animal receives only such an amount of the remedial agents as is beneficial while any liability of obtaining either large quantities of salt or large proportions of the remedies, such as may occur when the brick readily crumbles, is avoided. Moreover, the brick of the present invention being of a permanent character can be commercially handled without trouble and requires no special care in packing, since it is not necessary to inclose the brick in air tight packages as the brick does not disintegrate in damp weather as has been found to be the case with other commercial forms of medicated salt bricks.

Because the manufacture of the brick requires no special machinery or kiln drying, the cost of manufacture is reduced to a minimum and the brick may be profitably sold at a considerable reduction in price over salt bricks already on the market, or the brick may be made larger and heavier and be profitably sold at the same price as other bricks on the market.

A brick composed of the ingredients hereinbefore named is readily molded by hand in boxes and experience has shown that such a brick will harden in about two minutes and such a brick will retain its shape without crumbling either under the action of weather or age, or while being slowly absorbed by the animals for long periods of time. The brick is so inherently strong that it can be shipped and handled either without any packing at all or may be put up in the cheapest form of package obtainable. Because of the freedom from liability of crumbling or breaking down in a relatively short time, the brick may be handled by jobbers, thus reducing the cost of putting the bricks before the trade.

Not only does the lime employed aid in the stability of the brick, but it has the further advantage of counteracting the habit which most all stock acquires of eating dirt and the like, which habit is caused by indigestion.

The animal will naturally take but a certain quantity of salt and to obtain this quantity it will get only such amount of the remedial agents as are beneficial and not enough to do any harm. The administration of remedial agents by means of the salt brick saves daily dosing of the stock, since one block or brick will last from ten to thirty days. Stock in bad condition lick more salt and hence get more medicine. Stock in good condition will lick less salt and need and get less medicine.

What is claimed is:—

1. A salt brick for stock, comprising salt in predominate quantities, and slaked lime as a binder, the ingredients being intimately mixed and formed into a homogeneous mass of substantially brick shape.

2. A salt brick comprising salt in predominate quantities, slaked lime, and plaster of Paris, the lime and plaster of Paris serving as binding materials for the salt, and the ingredients being intimately mixed and formed into a homogeneous mass of substantially brick shape.

3. A salt brick comprising salt in predominate quantities, and slaked lime as a binder, the ingredients being intimately mixed and formed into a homogeneous mass of substantially brick shape, and the salt comprising approximately eighty-five per cent of the entire brick.

In testimony that I claim the foregoing as my own, I have hereto affixed my signature in the presence of two witnesses.

GEORGE L. EDGERTON

Witnesses:
DAVID R. WAGNER,
EDITH L. BROWN.